(12) United States Patent
Zhou et al.

(10) Patent No.: US 11,515,576 B2
(45) Date of Patent: Nov. 29, 2022

(54) LITHIUM-ION BATTERY HAVING SWITCHING ELEMENTS, AND METHOD OF MANUFACTURE THEREOF

(71) Applicant: Beijing BOE Technology Development Co., Ltd., Beijing (CN)

(72) Inventors: Quanguo Zhou, Beijing (CN); Lipeng Jiang, Beijing (CN); Lijia Zhou, Beijing (CN); Zhidong Wang, Beijing (CN); Hao Tang, Beijing (CN); Jiuyang Cheng, Beijing (CN); Qingguo Yang, Beijing (CN); Ronghua Lan, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 220 days.

(21) Appl. No.: 16/650,654

(22) PCT Filed: Feb. 22, 2019

(86) PCT No.: PCT/CN2019/075918
§ 371 (c)(1),
(2) Date: Mar. 26, 2020

(87) PCT Pub. No.: WO2020/168558
PCT Pub. Date: Aug. 27, 2020

(65) Prior Publication Data
US 2020/0274205 A1    Aug. 27, 2020

(51) Int. Cl.
*H01M 10/42* (2006.01)
*H01M 10/0525* (2010.01)
(Continued)

(52) U.S. Cl.
CPC ..... *H01M 10/425* (2013.01); *H01M 10/0525* (2013.01); *H01M 10/44* (2013.01); *H01M 10/46* (2013.01); *H01M 2010/4271* (2013.01)

(58) Field of Classification Search
CPC .......... H01M 10/425; H01M 10/0525; H01M 10/44; H01M 10/46; H01M 2010/4271;
(Continued)

(56) References Cited

U.S. PATENT DOCUMENTS 7,696,518 B2    4/2010    Koo
2017/0338470 A1*  11/2017  Inoue .................... H01M 4/525
(Continued)

FOREIGN PATENT DOCUMENTS

CN        1541039 A      10/2004
CN      103078154 A       5/2013
(Continued)

OTHER PUBLICATIONS

First Chinese Office Action from Chinese Patent Application No. 201980000197.X dated Mar. 15, 2022.
(Continued)

*Primary Examiner* — Gary D Harris
(74) *Attorney, Agent, or Firm* — Dilworth & Barrese, LLP.; Michael J. Musella, Esq.

(57) ABSTRACT

A battery and a manufacturing method thereof are disclosed. The battery includes at least one battery cell and at least one switching element; each of the at least one switching element is respectively connected to one or more of the at least one battery cell to control the one or more of the at least one battery cell.

9 Claims, 8 Drawing Sheets

(51) Int. Cl.
  *H01M 10/46* (2006.01)
  *H01M 10/44* (2006.01)
(58) Field of Classification Search
  CPC ......... H01M 10/0562; H01M 10/4207; H01M 10/0565; H01M 10/058; Y02E 60/10; Y02P 70/50
  USPC ............................................................ 429/7
  See application file for complete search history.

(56) References Cited

U.S. PATENT DOCUMENTS

2018/0012915 A1  1/2018  Kuriki et al.
2020/0335558 A1  10/2020  Zhou et al.

FOREIGN PATENT DOCUMENTS

| CN | 104538403 A | 4/2015 |
| CN | 105790339 A | 7/2016 |
| CN | 109037303 A | 12/2018 |
| JP | 2014158379 A | 8/2014 |

OTHER PUBLICATIONS

Second Chinese Office Action from Chinese Patent Application No. 201980000197 dated Jul. 8, 2022.

\* cited by examiner

LITHIUM-ION BATTERY HAVING SWITCHING ELEMENTS, AND METHOD OF MANUFACTURE THEREOF

TECHNICAL FIELD

Embodiments of the present disclosure relate to a battery and a manufacturing method thereof.

BACKGROUND

Lithium-ion batteries have characteristics of high energy density, light weight, and long lifetime, and are widely used in various fields such as electronic devices and electric vehicles. Lithium-ion batteries can be divided into liquid lithium-ion batteries, polymer lithium-ion batteries, and solid lithium-ion batteries according to the forms of electrolytes of the lithium-ion batteries. The liquid lithium-ion battery uses a liquid electrolyte and separates a positive electrode and a negative electrode of the battery by a diaphragm. The polymer lithium-ion battery uses a polymer electrolyte. The solid lithium-ion battery uses a solid electrolyte and has higher safety than the liquid lithium-ion battery. In addition, the solid lithium-ion battery also has advantages of light weight, long lifetime, fast charging, long endurance, high temperature charging and discharging, and flexibility, can be formed on various substrates, and meets the design needs of various circuits.

SUMMARY

At least one embodiment of the present disclosure provides a battery, and the battery comprises at least one battery cell and at least one switching element. Each of the at least one switching element is respectively connected to one or more of the at least one battery cell to control the one or more of the at least one battery cell.

For example, in the battery provided by at least one embodiment of the present disclosure, the battery is a lithium-ion battery, and the lithium-ion battery comprises at least one lithium-ion battery cell and at least one switching element. Each of the at least one switching element is respectively connected to one or more of the at least one lithium-ion battery cell to control the one or more of the at least one lithium-ion battery cell.

For example, in the lithium-ion battery provided by at least one embodiment of the present disclosure, the lithium-ion battery cell comprises a first electrode and a second electrode, and each of the first electrode and the second electrode is respectively connected to one of the at least one switching element.

For example, in the lithium-ion battery provided by at least one embodiment of the present disclosure, the switching element is a thin film transistor; the lithium-ion battery further comprises a first power line; a first electrode of the lithium-ion battery cell is connected to the first power line through a first thin film transistor; the first thin film transistor comprises a source electrode and a drain electrode, one of the source electrode and the drain electrode of the first thin film transistor is connected to the first electrode, and an other one of the source electrode and the drain electrode of the first thin film transistor is connected to the first power line.

For example, the lithium-ion battery provided by at least one embodiment of the present disclosure further comprises a second power line, a second electrode of the lithium-ion battery cell is connected to the second power line through a second thin film transistor, the second thin film transistor comprises a source electrode and a drain electrode, one of the source electrode and the drain electrode of the second thin film transistor is connected to the second electrode, and an other one of the source electrode and the drain electrode of the second thin film transistor is connected to the second power line.

For example, the lithium-ion battery provided by at least one embodiment of the present disclosure further comprises a control circuit configured to control each of the at least one lithium-ion battery cell to be charged and discharged; a gate electrode of the first thin film transistor and/or a gate electrode of the second thin film transistor is connected to the control circuit.

For example, in the lithium-ion battery provided by at least one embodiment of the present disclosure, the first power line and/or the second power line is connected to the control circuit.

For example, in the lithium-ion battery provided by at least one embodiment of the present disclosure, each of the at least one lithium-ion battery cell comprises a first electrode current collector, a first electrode, an electrolyte layer, a second electrode, and a second electrode current collector, and the first electrode current collector, the first electrode, the electrolyte layer, the second electrode, and the second electrode current collector are disposed in a stack manner; the first electrode current collector is in a same layer as one of a gate electrode layer and a source-drain electrode layer of the thin film transistor.

For example, in the lithium-ion battery provided by at least one embodiment of the present disclosure, the second electrode current collector is in a same layer as the other one selected from the group consisting of the gate electrode layer and the source-drain electrode layer of the thin film transistor.

For example, in the lithium-ion battery provided by at least one embodiment of the present disclosure, the electrolyte layer is a solid electrolyte layer.

At least one embodiment of the present disclosure provides a manufacturing method of a battery, and the manufacturing method comprises: forming at least one battery cell; and forming at least one switching element. Each of the at least one switching element is formed to be respectively connected to one or more of the at least one battery cell to control the one or more of the at least one battery cell.

For example, in the manufacturing method the battery provided by at least one embodiment of the present disclosure, the battery is a lithium-ion battery, and the lithium-ion battery comprises at least one lithium-ion battery cell and at least one switching element. Each of the at least one switching element is formed to be respectively connected to one or more of the at least one lithium-ion battery cell to control the one or more of the at least one lithium-ion battery cell.

For example, in the manufacturing method of the lithium-ion battery provided by at least one embodiment of the present disclosure, the switching element is a thin film transistor; and forming the thin film transistor comprises forming a gate electrode layer and a source-drain electrode layer.

For example, in the manufacturing method of the lithium-ion battery provided by at least one embodiment of the present disclosure, forming a lithium-ion battery cell comprises forming a first electrode current collector, a first electrode, an electrolyte layer, a second electrode, and a second electrode current collector, and the first electrode current collector, the first electrode, the electrolyte layer, the second electrode current collector, and the second electrode are formed in a stack manner; the first electrode current collector and one of the gate electrode layer and the source-drain electrode layer are formed by using a same film layer.

For example, in the manufacturing method of the lithium-ion battery provided by at least one embodiment of the present disclosure, the second electrode current collector and the other one selected from the group consisting of the gate electrode layer and the source-drain electrode layer are formed by using a same film layer.

For example, in the manufacturing method of the lithium-ion battery provided by at least one embodiment of the present disclosure, the electrolyte layer is a solid electrolyte layer.

In the lithium-ion battery provided by at least one embodiment of the present disclosure, the switching element can control the lithium-ion battery cell, for example, control whether the lithium-ion battery cell performs operations such as a charging operation, a discharging operation, or the like.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

DETAILED DESCRIPTION

Figure 1A:
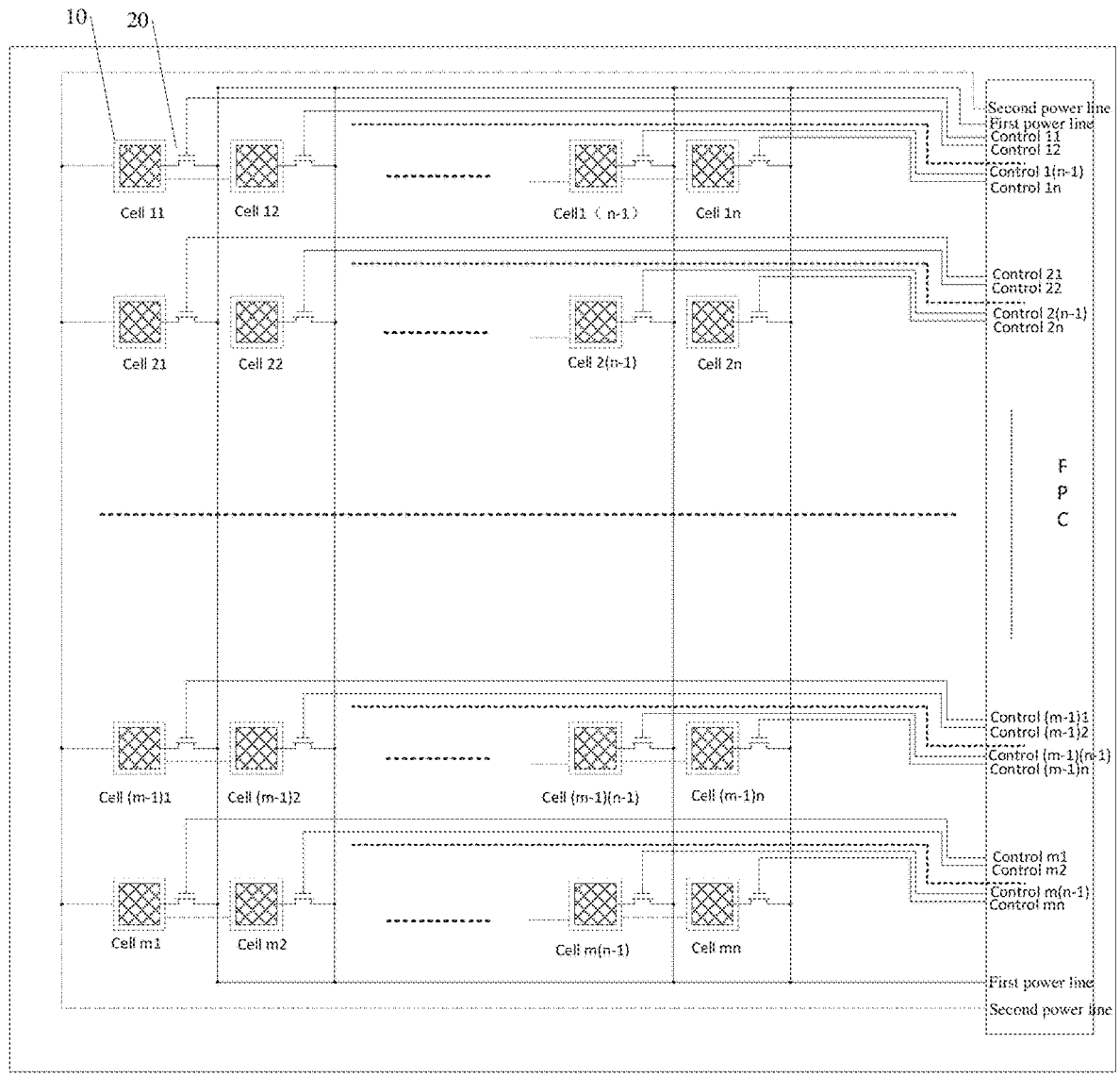
FIG. 1A is a first schematic plane view of a lithium-ion battery provided by an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

At present, lithium-ion batteries can generally be applied to different applications, for example, the lithium-ion batteries can be made very thin, so that the lithium-ion batteries can be combined into electronic devices to meet the thinning requirements of the electronic devices. However, because each functional film layer of a lithium-ion battery is very thin, if these functional film layers are damaged during a manufacturing process or during use, the lithium-ion battery will fail. In addition, the number of charging and discharging cycles of the lithium-ion battery is usually limited, so it is difficult to further prolong the service life of the lithium-ion battery.

At least one embodiment of the present disclosure provides a battery, and the battery comprises at least one battery cell and at least one switching element. Each of the at least one switching element is respectively connected to one or more of the at least one battery cell to control the one or more of the at least one battery cell.

For example, in the lithium-ion battery provided by at least one embodiment of the present disclosure, the battery is a lithium-ion battery, and the lithium-ion battery comprises at least one lithium-ion battery cell and at least one switching element. Each of the at least one switching element is respectively connected to one or more of the at least one lithium-ion battery cell to control the one or more of the at least one lithium-ion battery cell.

At least one embodiment of the present disclosure provides a manufacturing method of a battery, such as a lithium-ion battery, and the manufacturing method comprises: forming at least one lithium-ion battery cell; and forming at least one switching element. Each of the at least one switching element is formed to be respectively connected to one or more of the at least one lithium-ion battery cell to control the one or more of the at least one lithium-ion battery cell.

It should be noted that the battery provided by the embodiments of the present disclosure may be a battery of various types, and is not limited to the lithium-ion battery. In the following, the lithium-ion battery is taken as an example to illustrate the battery and the manufacturing method of the battery provided by the embodiments of the present disclosure.

At least one embodiment of the present disclosure provides a manufacturing method of a lithium-ion battery, and the manufacturing method comprises: forming at least one lithium-ion battery cell; and forming at least one switching element. Each of the at least one switching element is formed to be respectively connected to one or more of the at least one lithium-ion battery cell to control the one or more of the at least one lithium-ion battery cell.

The lithium-ion battery and the manufacturing method of the lithium-ion battery in the present disclosure are described below through several specific embodiments.

At least one embodiment of the present disclosure provides a lithium-ion battery, and the lithium-ion battery comprises at least one lithium-ion battery cell and at least one switching element. Each switching element is respectively connected to one or more lithium-ion battery cells to control the one or more lithium-ion battery cells, for example, to control whether the lithium-ion battery cells perform operations such as a charging operation, a discharging operation, or the like.

For example, the lithium-ion battery shown in FIG. 1A includes a plurality of lithium-ion battery cells 10 and a plurality of switching elements 20, the number of the switching elements 20 is the same as the number of the lithium-ion battery cells 10, and one switching element 20 is connected to one lithium-ion battery cell 10. For example, the plurality of lithium-ion battery cells 10 and the plurality of switching elements 20 of the lithium-ion battery are arranged in an array. For example, in FIG. 1A, taking a lithium-ion battery cell 10 and a switching element 20 connected to the lithium-ion battery cell 10 as an arrangement unit, the plurality of lithium-ion battery cells 10 and the plurality of switching elements 20 are arranged in m rows and n columns. In this case, the lithium-ion battery includes m×n lithium-ion battery cells 10 and m×n switching elements 20.

Figure 2A:
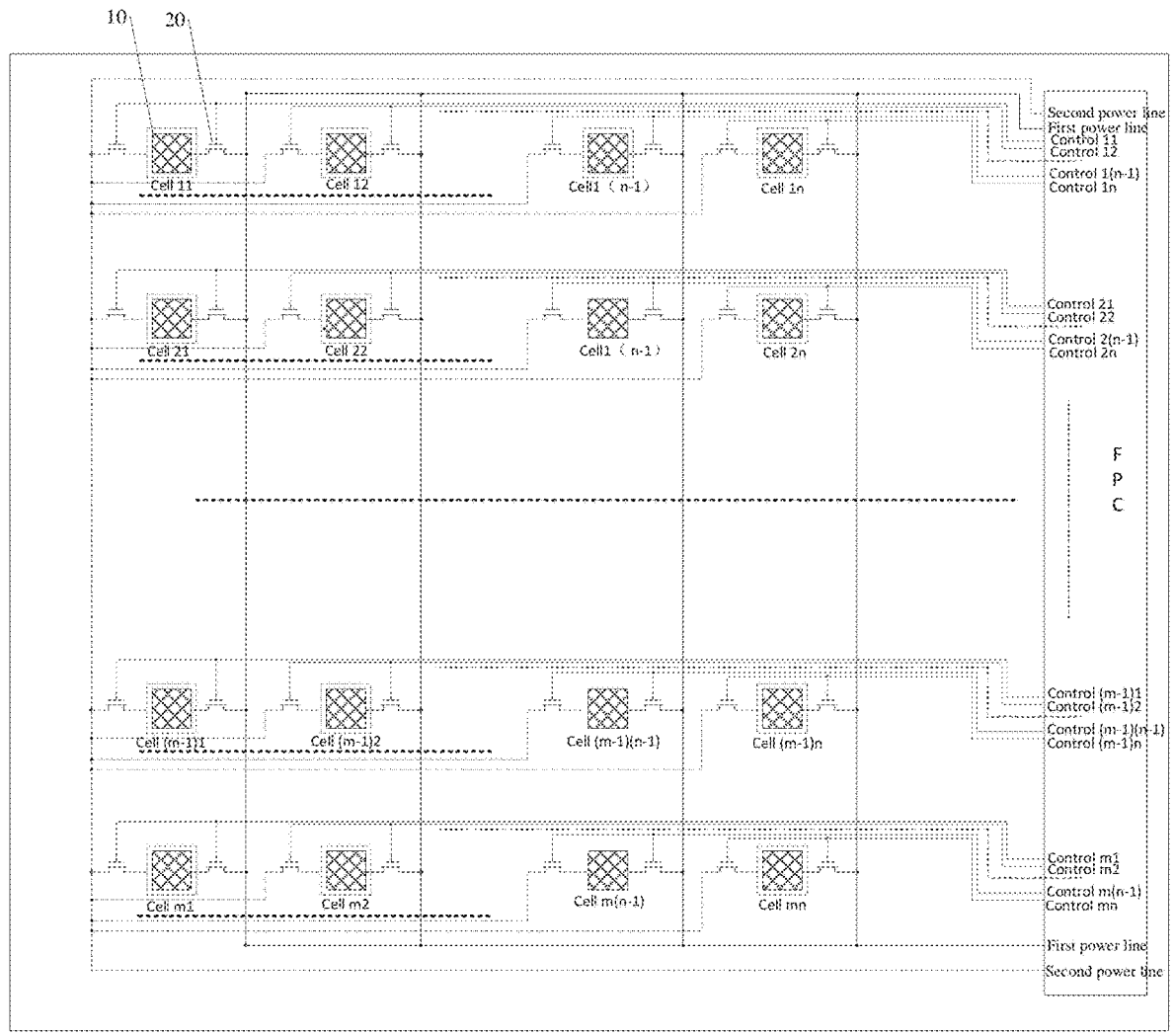
FIG. 2A is a third schematic plane view of a lithium-ion battery provided by an embodiment of the present disclosure.

For example, in another example of the embodiment, as shown in FIG. 2A, the number of switching elements 20 is twice the number of lithium-ion battery cells 10, a first electrode of a lithium-ion battery cell 10 is connected to a switching element 20, and a second electrode of the lithium-ion battery cell 10 is connected to a switching element 20, and in this case, two switching elements 20 control one lithium-ion battery cell 10. For example, FIG. 2A shows the plurality of lithium-ion battery cells 10 and the plurality of switching elements 20 of the lithium-ion battery, taking a lithium-ion battery cell 10 and two switching element 20 connected to the lithium-ion battery cell 10 as an arrangement unit, the plurality of lithium-ion battery cells 10 and the plurality of switching elements 20 are arranged in m rows and n columns. In this case, the lithium-ion battery includes m×n lithium-ion battery cells 10 and 2 ×m ×n switching elements 20.

Figure 3A:
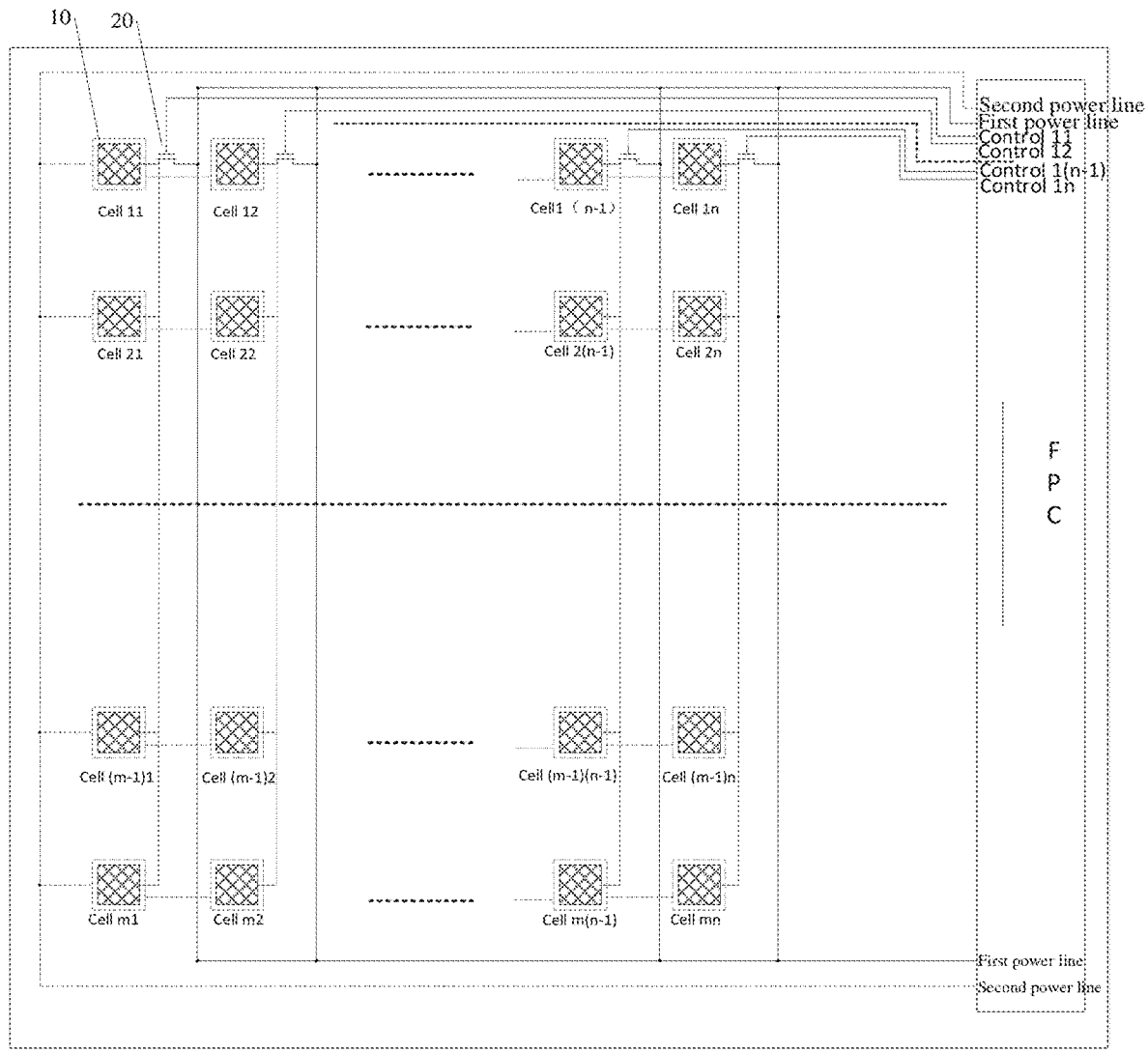
FIG. 3A is a fifth schematic plane view of a lithium-ion battery provided by an embodiment of the present disclosure.

For example, in another example of the embodiment, as shown in FIG. 3A, the number of lithium-ion battery cells 10 is N times the number of switching elements 20, and one switching element 20 is connected to N lithium-ion battery cells 10. For example, FIG. 3A shows the plurality of lithium-ion battery cells 10 and the plurality of switching elements 20 of the lithium-ion battery. The plurality of lithium-ion battery cells 10 are arranged in m rows and n columns, the plurality of switching elements 20 are arranged in one row, each switching element 20 is connected to lithium-ion battery cells 10 in a column, so that each switching element 20 can control the lithium-ion battery cells 10 in a column. In this case, the lithium-ion battery includes m×n lithium-ion battery cells 10 and n switching elements 20. For example, in other examples, the switching elements may also be arranged in one column, and each switching element is connected to and controls the lithium-ion battery cells in the same row. For another example, the lithium-ion battery is divided into a plurality of regions, and each region includes a certain number of lithium-ion battery cells, and each switching element is connected to and controls the lithium-ion battery cells located in one region. The embodiments do not limit the specific arrangements of the switching elements and the lithium-ion battery cells.

For example, in the embodiment, the switching element is a transistor having a switching function, such as a field effect transistor, such as a thin film transistor (TFT). For example, the lithium-ion battery further includes a first power line, and a first electrode of a lithium-ion battery cell is connected to the first power line through a first thin film transistor that serves as a switching element. For example, one selected from a group consisting of a source electrode and a drain electrode of the first thin film transistor is connected to the first electrode, and the other one selected from the group consisting of the source electrode and the drain electrode of the first thin film transistor is connected to the first power line. In this case, the first thin film transistor as the switching element can control whether the first power line applies an electrical signal to the first electrode of the lithium-ion battery cell.

For example, in some examples, the lithium-ion battery further includes a second power line, a second electrode of the lithium-ion battery cell is directly connected to the second power line, in this case, one lithium-ion battery cell is connected to one switching element. In other examples, the second electrode of the lithium-ion battery cell may be connected to the second power line through a second thin film transistor that serves as a switching element. For example, one selected from a group consisting of a source electrode and a drain electrode of the second thin film transistor is connected to the second electrode, and the other one selected from the group consisting of the source electrode and the drain electrode of the second thin film transistor is connected to the second power line. In this case, the second thin film transistor as the switching element can control whether the second power line applies an electrical signal to the second electrode of the lithium-ion battery cell. In this case, the first electrode and the second electrode of the lithium-ion battery cell are connected to the first power line and the second power line through the first thin film transistor and the second thin film transistor, respectively, so that two switching elements control one lithium-ion battery cell.

For example, the lithium-ion battery provided in the embodiment further includes a control circuit, and the control circuit is configured to control operations such as a charging operation, a discharging operation, or the like of each lithium-ion battery cell. For example, the control circuit is a flexible circuit board (FPC), an integrated circuit (IC), or the like. For example, a gate electrode of the first thin film transistor and/or a gate electrode of the second thin film transistor is connected to the control circuit, so that the control circuit can determine whether a signal is applied to the gate electrode of the first thin film transistor and/or the gate electrode of the second thin film transistor, so as to control whether the first thin film transistor and/or the second thin film transistor is turned on or turned off.

For example, in the embodiment, the first power line and/or the second power line may also be connected to the control circuit, so that the control circuit can also control whether the first power line and/or the second power line transmits power signals and the like.

Figure 1B:
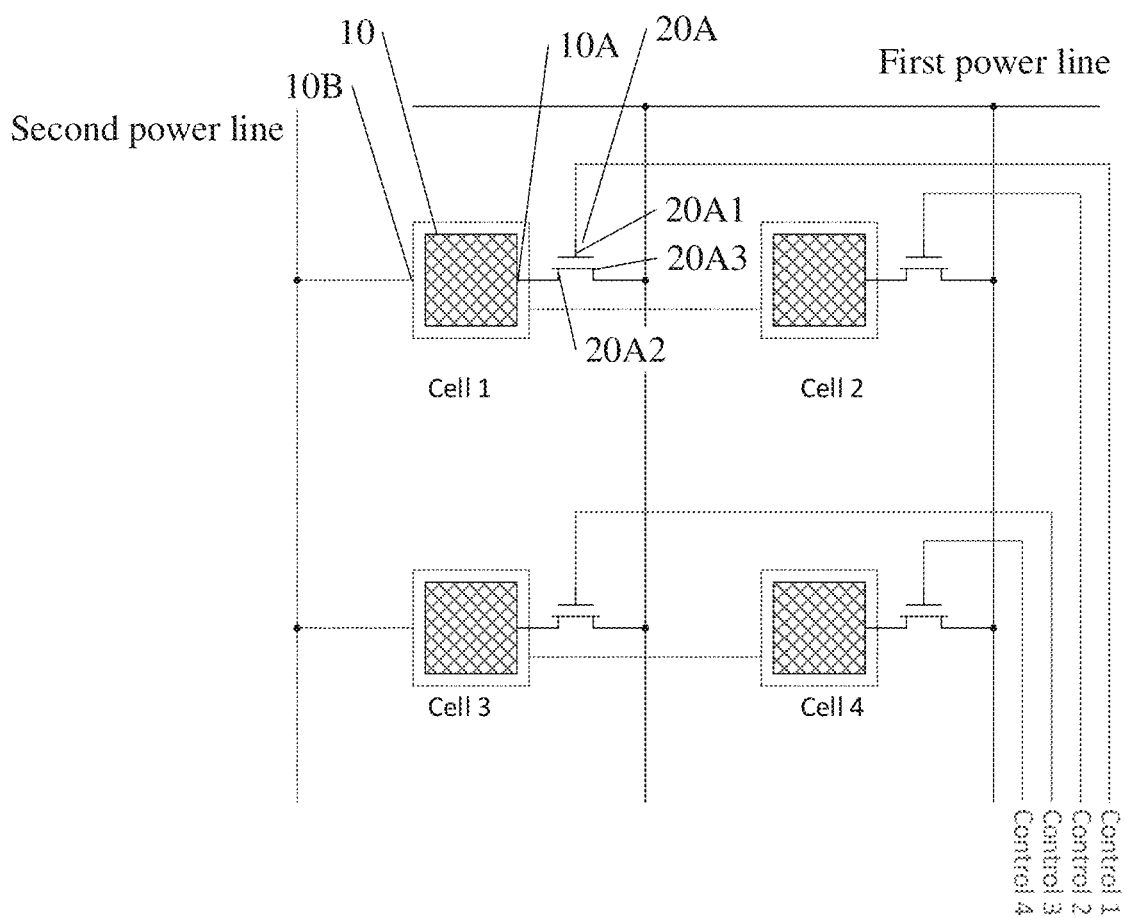
FIG. 1B is a second schematic plane view of a lithium-ion battery provided by an embodiment of the present disclosure.
Figure 2B:
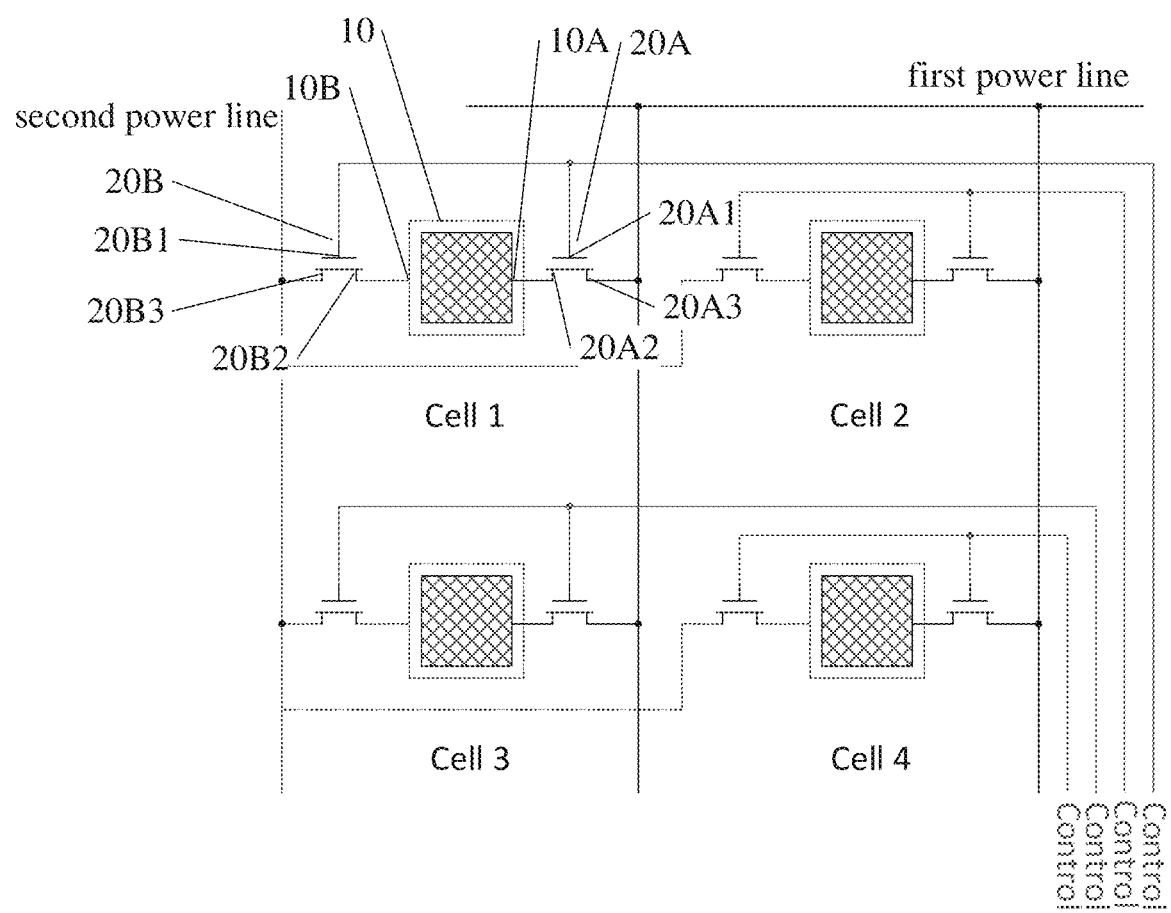
FIG. 2B is a fourth schematic plane view of a lithium-ion battery provided by an embodiment of the present disclosure.
Figure 3B:
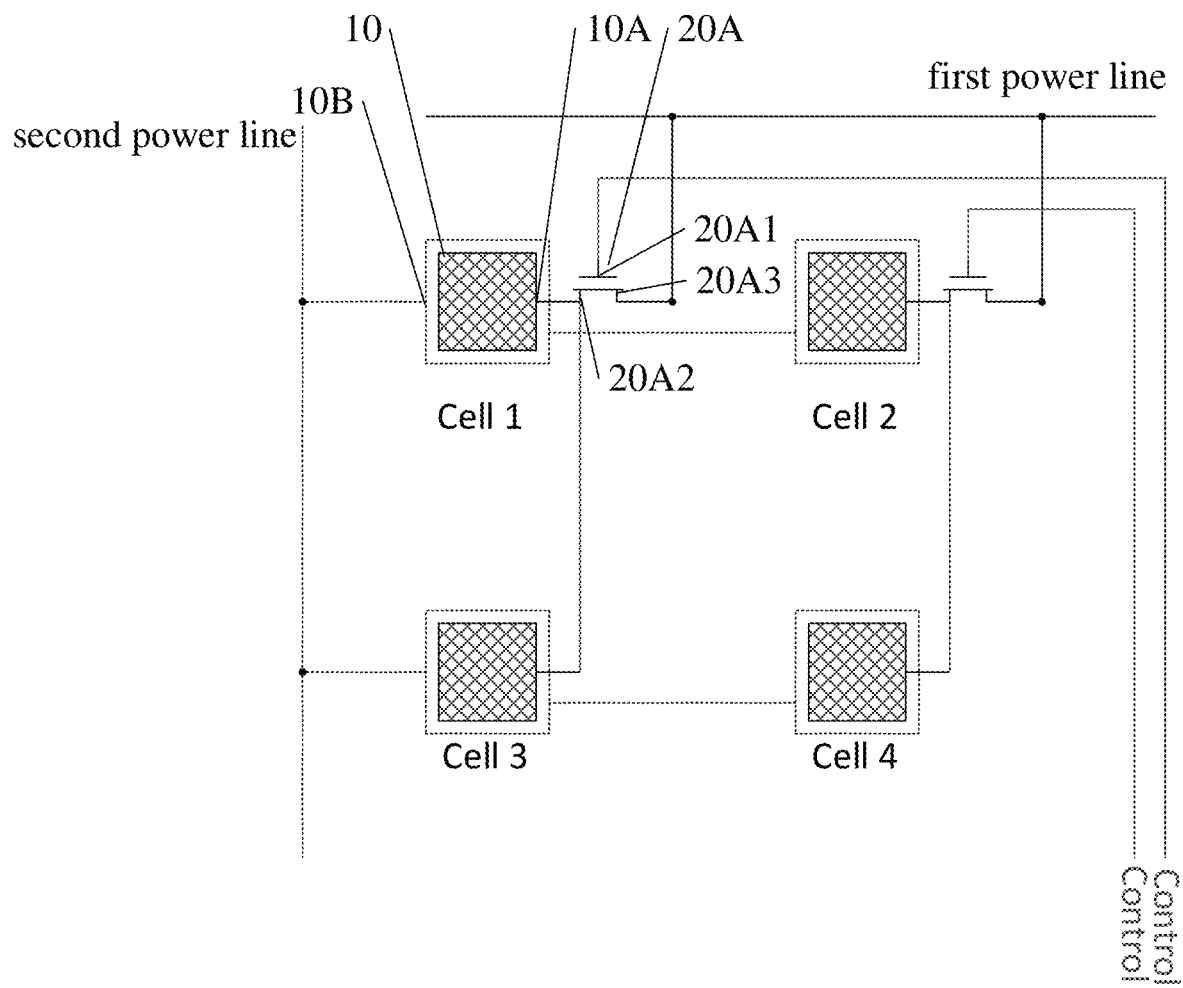
FIG. 3B is a sixth schematic plane view of a lithium-ion battery provided by an embodiment of the present disclosure.

FIG. 1B shows a situation that the lithium-ion battery shown in FIG. 1A includes four lithium-ion battery cells; FIG. 2B shows a situation that the lithium-ion battery shown in FIG. 2A includes four lithium-ion battery cells; and FIG. 3B shows a situation that the lithium-ion battery shown in FIG. 3A includes four lithium-ion battery cells. For the sake of clarity, the lithium-ion batteries in different examples of the embodiment are described in detail below with reference to FIG. 1B, FIG. 2B, and FIG. 3B.

As shown in FIG. 1B, in the lithium-ion battery provided in this example, the number of switching elements and the number of lithium-ion battery cells 10 are both four, and one switching element is connected to one lithium-ion battery cell 10. In this example, the lithium-ion battery includes a first power line and a second power line, and the first electrode 10A of the lithium-ion battery cell 10 is connected to the first power line through the first thin film transistor 20A. For example, the source electrode 20A2 of the first thin film transistor 20A is connected to the first electrode 10A, and the drain electrode 20A3 of the first thin film transistor 20A is connected to the first power line. In this case, the first thin film transistor 20A can control whether the first power line applies an electrical signal to the first electrode 10A of the lithium-ion battery cell. In this example, the second electrode 10B of the lithium-ion battery cell 10 is directly connected to the second power line. For example, the gate electrode 20A1 of the first thin film transistor 20A is a control terminal (Control), the control terminal may be connected to a control circuit, such as an FPC as shown in FIG. 1A, so that the control circuit can control the first thin film transistor 20A to be turned on or turned off according to instructions. For example, the first power line and the second power line may also be connected to the control circuit, so that the control circuit can apply a power signal or the like to the lithium-ion battery cell 10 according to instructions.

As shown in FIG. 2B, in the lithium-ion battery provided in this example, the number of switching elements is twice the number of the lithium-ion battery cells 10, the number of the lithium-ion battery cells 10 is four, the number of the switching elements is eight. A first electrode 10A of a lithium-ion battery cell is connected to a switching element, and a second electrode 10B of the lithium-ion battery cell is also connected to a switching element. In this example, the lithium-ion battery includes a first power line and a second power line. The first electrode 10A of the lithium-ion battery cell 10 is connected to the first power line through the first thin film transistor 20A, and the second electrode 10B of the lithium-ion battery cell 10 is connected to the second power line through the second thin film transistor 20B. For example, the source electrode 20A2 of the first thin film transistor 20A is connected to the first electrode 10A, and the drain electrode 20A3 of the first thin film transistor 20A is connected to the first power line; the source electrode 20B2 of the second thin film transistor 20B is connected to the second electrode 10B, and the drain electrode 20B3 of the second thin film transistor 20B is connected to the second power line. In this case, the first thin film transistor 20A can control whether the first power line applies an electrical signal to the first electrode 10A of the lithium-ion battery cell, and the second thin film transistor 20B can control whether the second power line applies an electrical signal to the second electrode 10B of the lithium-ion battery cell. For example, the gate electrode 20A1 of the first thin film transistor 20A and the gate electrode 20B1 of the second thin film transistor 20B are control terminals and may be connected to a control circuit, such as an FPC as shown in FIG. 2A, and therefore the control circuit can control the first thin film transistor 20A and the second thin film transistor 20B to be turned on or turned off according to instructions. For example, the first power line and the second power line may also be connected to the control circuit, so that the control circuit can apply a power signal to the lithium-ion battery cell 10 according to instructions.

As shown in FIG. 3B, in the lithium-ion battery provided in this example, the number of lithium-ion battery cells 10 is twice the number of switching elements, and one switching element is connected to two lithium-ion battery cells 10 located in one column. In this example, the lithium-ion battery includes a first power line and a second power line, and the first electrode 10A of the lithium-ion battery cell 10 is connected to the first power line through the first thin film transistor 20A. For example, the source electrode 20A2 of the first thin film transistor 20A is connected to the first electrodes 10A of the two lithium-ion battery cells 10 located in one column, and the drain electrode 20A3 of the first thin film transistor 20A is connected to the first power line. In this case, one first thin film transistor 20A can control the lithium-ion battery cells 10 located in one column. For example, the second electrode 10B of the lithium-ion battery cell 10 is directly connected to the second power line. For example, the gate electrode 20A1 of the first thin film transistor 20A is a control terminal, and may be connected to a control circuit, such as an FPC as shown in FIG. 3A, so that the control circuit can control the first thin film transistor 20A to be turned on or turned off according to instructions. For example, the first power line and the second power line may also be connected to the control circuit, so that the control circuit can apply a power signal and the like to the lithium-ion battery cell 10 according to instructions.

For example, in the embodiment, the first power line may be a positive electrode power line, and accordingly, the first electrode of the lithium-ion battery cell is a positive electrode, in this case, the second power line is a negative electrode power line, and the second electrode of the lithium-ion battery cell is a negative electrode; alternatively, the first power line is a negative electrode power line, and accordingly, the first electrode of the lithium-ion battery cell is a negative electrode, in this case, the second power line is a positive electrode power line, and the second electrode of the lithium-ion battery cell is a positive electrode. The embodiments do not specifically limit the arrangements of the positive electrode and the negative electrode connection of the power line and the arrangements of the positive electrode and the negative electrode of the lithium-ion battery cell.

Figure 4:
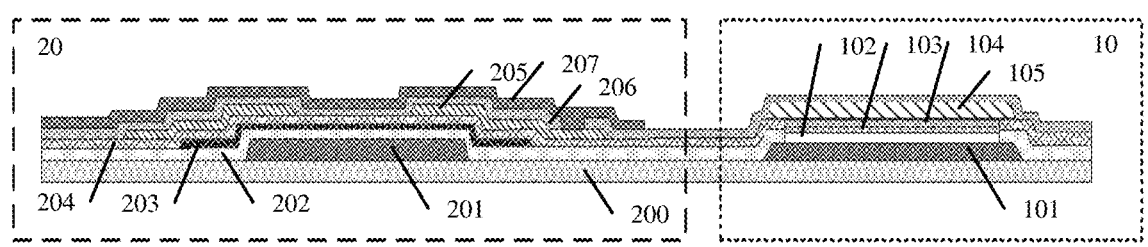
FIG. 4 is a first schematic cross-sectional view of a lithium-ion battery provided by an embodiment of the present disclosure.

For example, in the embodiment, the lithium-ion battery cell includes a first electrode current collector, a first electrode, an electrolyte layer, a second electrode, and a second electrode current collector, and the first electrode current collector, the first electrode, the electrolyte layer, the second electrode, and the second electrode current collector are disposed in a stack manner. For example, as shown in FIG. 4, the lithium-ion battery cell 10 includes a first electrode current collector 101, a first electrode 102, an electrolyte layer 103, a second electrode current collector 105, and a second electrode 104. For example, the thin film transistor that serves as the switching element 20 includes a gate electrode layer 201 and a source-drain electrode layer 205, the gate electrode layer includes a gate electrode as a control terminal, and the source-drain electrode layer includes a source electrode and a drain electrode. For example, the first electrode current collector 101 and the gate electrode layer 201 of the thin film transistor are disposed in the same layer, so that in the manufacturing process of the lithium-ion battery, the first electrode current collector 101 and the gate electrode layer 201 of the thin film transistor can be formed by using the same film layer, and the manufacturing process of the lithium-ion battery can be simplified.

For example, in the embodiment, as shown in FIG. 4, the second electrode current collector 105 of the lithium-ion battery cell 10 may be disposed in the same layer as the source-drain electrode layer 205 of the thin film transistor, so that in the manufacturing process of the lithium-ion battery, the second electrode current collector 105 and the source-drain electrode layer 205 of the thin film transistor can be formed by using the same film layer, and the manufacturing process of the lithium-ion battery can be further simplified.

Figure 5:
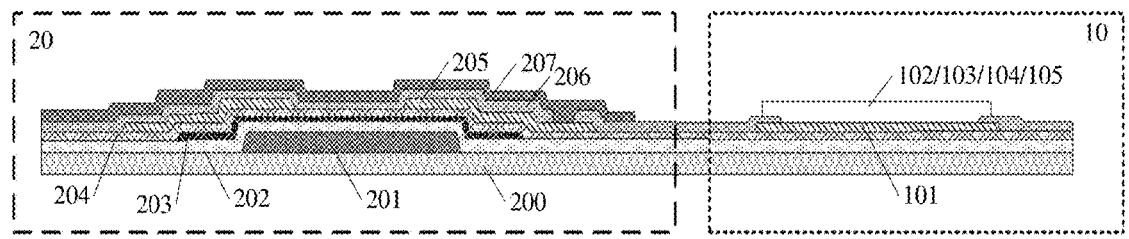
FIG. 5 is a second schematic cross-sectional view of a lithium-ion battery provided by an embodiment of the present disclosure.
Figure 6:
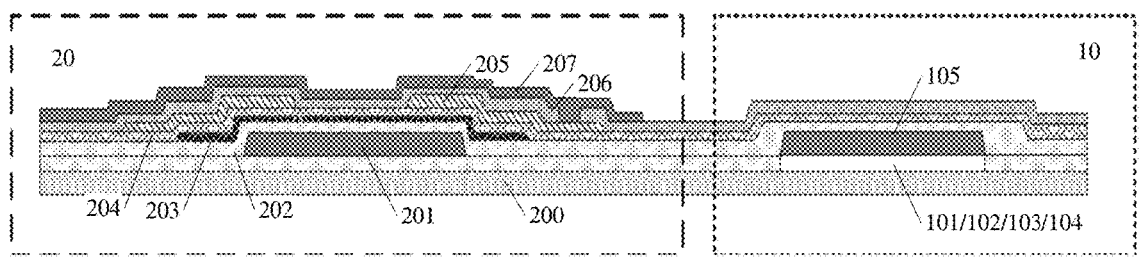
FIG. 6 is a third schematic cross-sectional view of a lithium-ion battery provided by an embodiment of the present disclosure.

For example, in another example of the embodiment, as shown in FIG. 5, the first electrode current collector 101 of the lithium-ion battery cell 10 and the source-drain layer 205 of the thin film transistor may also be disposed in the same layer; alternatively, as shown in FIG. 6, the second electrode current collector 105 of the lithium-ion battery cell 10 may be disposed in the same layer as the gate electrode layer 201 of the thin film transistor. In this case, the lithium-ion battery cell 10 has a functional layer disposed in the same layer as a functional layer of the thin film transistor, in this case, the functional layers disposed in the same layer can be formed by using the same film layer, which can also simplify the manufacturing process of the lithium-ion battery.

It should be noted that, for clarity, FIGS. 5 and 6 do not show the specific structures of the first electrode current collector 101, the first electrode 102, the electrolyte layer 103, the second electrode 104, and the second electrode current collector 105, which are stacked, in the lithium-ion battery cell 10, and the specific structures of the first electrode current collector 101, the first electrode 102, the electrolyte layer 103, the second electrode 104, and the second electrode current collector 105 can refer to FIG. 4. In addition, the thin film transistor provided in the embodiment may further include structures such as a gate insulating layer 202, an active layer 203, a first insulating layer 204, a second insulating layer 206, and a connection electrode 207, and the embodiments do not limit these structures.

For example, in the embodiment, as shown in FIGS. 4-6, the lithium-ion battery may further include a substrate 100, and the lithium-ion battery cell 10 and the switching element 20 may be disposed on the substrate 100. For example, the substrate 100 may be a rigid substrate or a flexible substrate. For example, the rigid substrate may be a rigid substrate plate, and a material of the rigid substrate may include glass, polymer (such as plastic), metal sheet, silicon wafer, quartz, ceramic, mica, and the like. For example, the flexible substrate may be a flexible substrate plate or a flexible film, and a material of the flexible substrate may include polyimide (PI), polyethylene terephthalate (PET), a metal film, and the like. The embodiments of the present disclosure do not limit the specific form of the substrate 100.

For example, in the lithium-ion battery cell 10 provided in the embodiment, the first electrode current collector 101 is a positive electrode current collector, and a material of the first electrode current collector 101 includes one or more of Mo, Al, Ni, stainless steel, graphite, and amorphous carbon. For example, the first electrode 102 is a positive electrode, and a material of the first electrode 102 includes one or more of LCO, LMO, LNMO, NCA, NCM, $CuS_2$, $TiS_2$, $FeS_2$, $SnS_2$, $LiFePO_4$, $LiMnPO_4$, $LiCoPO_4$, $LiNiPO_4$, $Li_3V_2(PO_4)_3$, $Li_2FeSiO_4$, $Li_2MnSiO_4$, $Li_2CoSiO_4$, $Li_2NiSiO_4$, $Li_2Fe_2(SO_4)_3$, $LiFeBO_3$, $LiMnBO_3$, $LiCoBO_3$, $LiNiBO_3$, and $V_2O_5$. For example, the electrolyte layer 103 is a solid electrolyte layer, and a material of the solid electrolyte layer includes, for example, one or more of LiPON, LLTO, LGSP, LPS, Thio-LiSiCON, LATP, LLZO, $Li_2S$, $SiS_2$, $P_2S_5$, $SiS_2$, and $B_2S_3$; alternatively, the electrolyte layer 103 is a polymer electrolyte layer, and a material of the polymer electrolyte layer includes, for example, methyl methacrylate (MMA), methyl acrylate (MA), and derivatives thereof. For example, the second electrode 104 is a negative electrode, and a material of the second electrode 104 includes one or more of tin oxide ($SnO_2$), graphite, lithium metal, lithium alloy, and lithium compound. For example, the second electrode current collector 105 is a negative electrode current collector, and a material of the second electrode current collector 105 includes one or more of Mo, Cu, Ni, stainless steel, graphite, and amorphous carbon.

For example, in other examples, the first electrode current collector 101 may be provided as a negative electrode current collector, and accordingly, the first electrode 102 is provided as a negative electrode, the second electrode current collector 105 is provided as a positive electrode current collector, and the second electrode 104 is provided as a positive electrode. The embodiments of the present disclosure do not specifically limit the arrangements and forming materials of the functional layers of the lithium-ion battery cell 10.

For example, in the lithium-ion battery provided in the embodiment, a material of the gate electrode layer 201 of the thin film transistor as the switching element 20 may include one or more of molybdenum, molybdenum alloy, copper, copper alloy, aluminum, aluminum alloy, titanium, and titanium alloy; alternatively, the gate electrode layer 201 and the first electrode current collector 101 or the second electrode current collector 105, which is disposed in the same layer as the gate electrode layer 201, are made of the same material. For example, a material of the gate insulating layer 202, a material of the first insulating layer 204, and a material of the second insulating layer 206 may be an inorganic insulating material or an organic insulating material. The inorganic insulating material includes, for example, silicon oxide, nitrogen oxide, and the like; and the organic insulating material includes, for example, a resin material or the like. In addition, the material of the gate insulating layer 202, the material of the first insulating layer 204, and the material of the second insulating layer 206 may be the same or different. For example, a material of the active layer 203 may include amorphous silicon, polysilicon, a metal oxide semiconductor, or the like. For example, the polysilicon may be high temperature polysilicon or low temperature polysilicon, and the oxide semiconductor may be indium gallium zinc oxide, indium zinc oxide, zinc oxide, or gallium zinc oxide. For example, a material of the source-drain electrode layer 205 may include one or more of molybdenum, molybdenum alloy, copper, copper alloy, aluminum, aluminum alloy, titanium, and titanium alloy; alternatively, the source-drain electrode layer 205 and the first electrode current collector 101 or the second electrode current collector 105, which is disposed in the same layer as the source-drain electrode layer 205, are made of the same material. For example, a material of the connection electrode 207 may be a transparent conductive material, such as indium tin oxide, indium zinc oxide, indium gallium oxide, gallium zinc oxide, or carbon nanotubes. The embodiments of the present disclosure do not specifically limit the materials of the functional layers of the thin film transistor.

In the lithium-ion battery provided in the embodiment, the switching element can control each lithium-ion battery cell, for example, control a charging operation, a discharging operation, or the like of each lithium-ion battery cell. Therefore, the switching element can selectively turn on one or some of the lithium-ion battery cells, so that the lithium-ion battery cells of the lithium-ion battery can work independently, in a case of not needed, the lithium-ion battery cells can work at different time to reduce unnecessary waste of resources. For example, the lithium-ion battery cells can respectively and independently perform a charging operation and a discharging operation, to reduce unnecessary charging and discharging of some lithium-ion battery cells, thereby prolonging the lifetime of the lithium-ion battery cells. In addition, in the lithium-ion battery provided in the embodiment, each lithium-ion battery cell is independent, in a case where a lithium-ion battery cell is damaged, other lithium-ion battery cells can still work normally, thereby not affecting the normal use of the overall lithium-ion battery and making the lithium-ion battery have higher stability and reliability.

At least one embodiment of the present disclosure provides a manufacturing method of a battery, and the manufacturing method comprises: forming at least one lithium ion battery cell; and forming at least one switching element. Each of the at least one switching element is formed to be respectively connected to one or more of the at least one lithium ion battery cell to control the one or more of the at least one battery cell.

For example, in the manufacturing method the battery provided by at least one embodiment of the present disclosure, the battery is a lithium-ion battery, and the lithium-ion battery comprises at least one lithium-ion battery cell and at least one switching element. Each of the at least one switching element is formed to be respectively connected to one or more of the at least one lithium-ion battery cell to control the one or more of the at least one lithium-ion battery cell.

For example, in the embodiment, the switching element may be a transistor having a switching function, such as a thin film transistor (TFT). Forming a thin film transistor includes forming a gate electrode layer and a source-drain electrode layer.

For example, in the embodiment, forming a lithium-ion battery cell includes forming a first electrode current collector, a first electrode, an electrolyte layer, a second electrode, and a second electrode current collector, in which the first electrode current collector, the first electrode, the electrolyte layer, the second electrode, and the second electrode current collector are formed in a stack manner; and the electrolyte layer may include a solid electrolyte or a polymer electrolyte.

For example, in the embodiment, the first electrode current collector of the lithium-ion battery cell and one layer selected from a group consisting of the gate electrode layer and the source-drain electrode layer of the thin film transistor are formed by using the same film layer. For example, in some examples, the second electrode current collector of the lithium-ion battery cell and the other layer selected from the group consisting of the gate electrode layer and the source-drain electrode layer of the thin film transistor are formed by using the same film layer, thereby simplifying the manufacturing process of the lithium-ion battery.

Hereinafter, the manufacturing method for manufacturing the lithium-ion battery provided in the embodiment is described in detail below with reference to FIGS. 7A-7D.

Figure 7A:
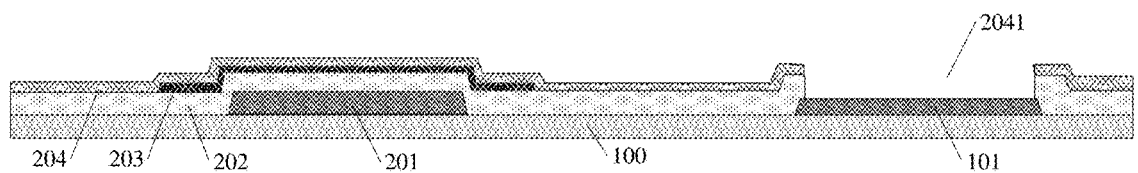
FIGS. 7A-7D are schematic cross-sectional views of a lithium-ion battery during a manufacturing process provided by an embodiment of the disclosure.

As shown in FIG. 7A, first, a first electrode current collector 101 of a lithium-ion battery cell and a gate electrode layer 201 of a thin film transistor that serves as a switching element are formed on a substrate 100.

For example, the first electrode current collector 101 and the gate electrode layer 201 are formed by using the same film layer. For example, in this example, the first electrode current collector 101 is a positive electrode current collector, and the materials of the first electrode current collector 101 and the gate electrode layer 201 are Mo, Al, Ni, stainless steel, or the like.

For example, a film forming method, such as evaporation, sputtering, or deposition, is used to form a gate material thin film on the substrate 100, and then a patterning process is performed on the gate material thin film to form the patterned first electrode current collector 101 and the patterned gate electrode layer 201. For example, the patterning process includes steps of coating, exposing, and developing a photoresist.

For example, the substrate 100 may be a rigid substrate or a flexible substrate. For example, the rigid substrate may be a rigid substrate plate, and a material of the rigid substrate may include glass, polymer (such as plastic), metal sheet, silicon wafer, quartz, ceramic, mica, and the like. For example, the flexible substrate may be a flexible substrate plate or a flexible film, and a material of the flexible substrate may include polyimide (PI), polyethylene terephthalate (PET), a metal film, and the like. The embodiments of the present disclosure do not limit the specific form of the substrate 100.

As shown in FIG. 7A, after the first electrode current collector 101 and the gate electrode layer 201 are formed, a film forming method, such as evaporation, sputtering, or deposition, is used to form a gate insulating layer 202 on the first electrode current collector 101 and the gate electrode layer 201. The gate insulating layer 202 may be formed of, for example, an inorganic insulating material or an organic insulating material. The inorganic insulating material includes, for example, silicon oxide, nitrogen oxide, and the like, and the organic insulating material includes, for example, a resin material or the like.

For example, after the gate insulating layer 202 is formed, an active layer 203 is formed on the gate insulating layer 202. For example, a film forming method, such as evaporation, sputtering, or deposition, is used to form an active material layer on the gate insulating layer 202, and then a patterning process is performed on the active material layer to form a patterned active layer 203. For example, the material of the active layer 203 may include amorphous silicon, polysilicon, a metal oxide semiconductor, or the like. For example, the polysilicon may be high temperature polysilicon or low temperature polysilicon, and the oxide semiconductor may be indium gallium zinc oxide, indium zinc oxide, zinc oxide, gallium zinc oxide, or the like.

For example, after the active layer 203 is formed, a film forming method, such as evaporation, sputtering, or deposition, is used to form a first insulating layer 204 on the active layer 203. The first insulating layer 204 may be formed of, for example, an inorganic insulating material or an organic insulating material. The inorganic insulating material includes, for example, silicon oxide, nitrogen oxide, or the like, and the organic insulating material includes, for example, a resin material or the like.

For example, after the first insulating layer 204 is formed, a patterning process is performed on the first insulating layer 204 and the gate insulating layer 202 to form a via hole 2041, which exposes the first electrode current collector 101, in the first insulating layer 204 and the gate insulating layer 202, so as to facilitate forming other functional structures of the lithium-ion battery cell on the first electrode current collector 101.

Figure 7B:
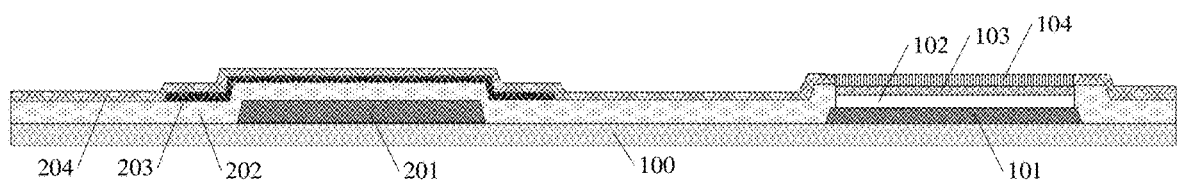

For example, as shown in FIG. 7B, in the via hole 2041, a first electrode 102, an electrolyte layer 103, and a second electrode 104 are sequentially formed on the first electrode current collector 101. For example, a film forming method, such as evaporation, sputtering, or deposition, is used to directly form a patterned first electrode 102, a patterned electrolyte layer 103, and a patterned second electrode 104 on the first electrode current collector 101 through a mask.

For example, in this example, the first electrode 102 is a positive electrode, and the material of the first electrode 102 includes one or more of LCO, LMO, LNMO, NCA, NCM, $CuS_2$, $TiS_2$, $FeS_2$, $SnS_2$, $LiFePO_4$, $LiMnPO_4$, $LiCoPO_4$, $LiNiPO_4$, $Li_3V_2(PO_4)_3$, $Li_2FeSiO_4$, $Li_2MnSiO_4$, $Li_2CoSiO_4$, $Li_2NiSiO_4$, $Li_2Fe_2(SO_4)_3$, $LiFeBO_3$, $LiMnBO_3$, $LiCoBO_3$, $LiNiBO_3$, and $V_2O_5$. For example, the electrolyte layer 103 is a solid electrolyte layer, and the material of the solid electrolyte layer includes, for example, one or more of LiPON, LLTO, LGSP, LPS, Thio-LiSiCON, LATP, LLZO, $Li_2S$, $SiS_2$, $P_2S_5$, $SiS_2$, and $B_2S_3$; alternatively, the electrolyte layer 103 is a polymer electrolyte layer, and the material of the polymer electrolyte layer includes, for example, methyl methacrylate (MMA), methyl acrylate (MA), and derivatives thereof. For example, the second electrode 104 is a negative electrode, and the material of the second electrode 104 includes one or more of tin oxide ($SnO_2$), graphite, lithium metal, lithium alloy, and lithium compound.

Figure 7C:
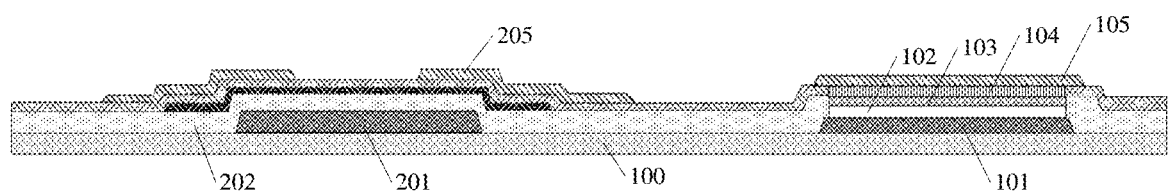

For example, as shown in FIG. 7C, after the second electrode 104 is formed, a second electrode current collector 105 and a source-drain electrode layer 205 are formed. For example, the second electrode current collector 105 and the source-drain electrode layer 205 are formed by using the same film layer.

For example, in this example, the second electrode current collector 105 is a negative electrode current collector, and the material of the source-drain electrode layer 205 and the material of the second electrode current collector 105 include Mo, Cu, Ni, stainless steel, or the like. For example, a film forming method, such as evaporation, sputtering, or deposition, is used to form a source-drain electrode material thin film, and then a patterning process is performed on the source-drain electrode material thin film to form a patterned second electrode current collector 105 and a patterned source-drain electrode layer 205.

Figure 7D:
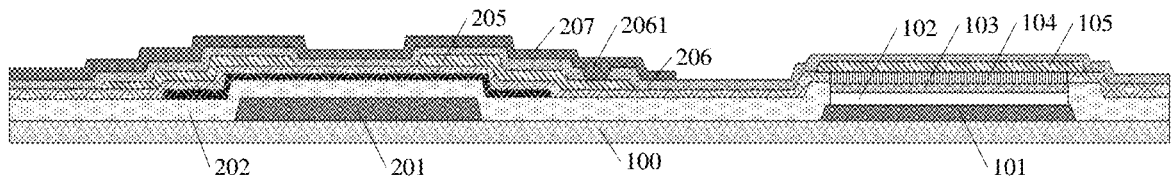

As shown in FIG. 7D, after the second electrode current collector 105 and the source-drain electrode layer 205 are formed, a film forming method, such as evaporation, sputtering, or deposition, is used to form a second insulating material layer, and then a patterning process is then performed on the second insulating material layer to form a second insulating layer 206. For example, the second insulating layer 206 includes a via hole 2061 that exposes the source electrode or the drain electrode in the source-drain electrode layer 204.

For example, the material of the second insulating layer 206 may be an inorganic insulating material or an organic insulating material. The inorganic insulating material includes, for example, silicon oxide, nitrogen oxide, or the like, and the organic insulating material includes, for example, a resin material or the like.

For example, after the second insulating layer 206 is formed, a film forming method, such as evaporation, sputtering, or deposition, is used to form a connection electrode material layer, and then a patterning process is performed on the connection electrode material layer to form a patterned connection electrode 207. For example, the material of the connection electrode 207 may include a transparent conductive material, such as indium tin oxide, indium zinc oxide, indium gallium oxide, gallium zinc oxide, carbon nanotubes, or the like.

It should be noted that, in other examples, the first electrode current collector 101 may be formed as a negative electrode current collector, and accordingly, the first electrode 102 is formed as a negative electrode, the second electrode current collector 105 is formed as a positive electrode current collector, and the second electrode 104 is formed as a positive electrode. The embodiments of the present disclosure do not specifically limit the arrangements and forming materials of the functional layers of the lithium-ion battery cell 10.

For example, in some examples, forming the lithium-ion battery further includes forming a first power line and a second power line. In this case, the first electrode of the lithium-ion battery cell, for example, the first electrode current collector 101, is formed to be electrically connected to one selected from a group consisting of the source electrode and the drain electrode of the thin film transistor, for example, connected to one selected from the group consisting of the source electrode and the drain electrode of the thin film transistor through the via hole in the gate insulating layer 202 and the first insulating layer 204; the other one selected from the group consisting of the source electrode and the drain electrode of the thin film transistor is electrically connected to the first power line, for example, is electrically connected to the first power line through the connection electrode 207. In this case, the thin film transistor can control whether the first power line applies an electrical signal to the first electrode of the lithium-ion battery cell. For example, the second electrode of the lithium-ion battery cell, for example, the second electrode current collector 105, is formed to be directly connected to the second power line.

For example, in other examples, forming the lithium-ion battery further includes forming a first power line and a second power line, and forming two thin film transistors as switching elements. The first electrode of the lithium-ion battery cell, for example, the first electrode current collector 101, is formed to be electrically connected to one selected from a group consisting of the source electrode and the drain electrode of the first thin film transistor, and the other one selected from the group consisting of the source electrode and the drain electrode of the first thin film transistor is electrically connected to the first power line. The second electrode of the lithium-ion battery cell, for example, the second electrode current collector 105, is formed to be electrically connected to one selected from a group consisting of the source electrode and the drain electrode of the second thin film transistor, for example, is electrically connected to one selected from the group consisting of the source electrode and the drain electrode of the second thin film transistor through a via hole in the gate insulating layer and the first insulating layer; and the other one selected from the group consisting of the source electrode and the drain electrode of the second thin film transistor is electrically connected to the second power line, for example, is electrically connected to the second power line through the connection electrode. In this case, the first thin film transistor can control whether the first power line applies an electrical signal to the first electrode of the lithium-ion battery cell, and the second thin film transistor can control whether the second power line applies an electrical signal to the second electrode of the lithium-ion battery cell.

For example, forming the lithium-ion battery may further include forming a control circuit, and the control circuit is configured to control each lithium-ion battery cell to be charged and discharged. For example, the control circuit may use a flexible circuit board (FPC), an integrated circuit (IC), or the like. For example, a gate electrode of the first thin film transistor and/or a gate electrode of the second thin film transistor is connected to the control circuit, so that the control circuit can determine whether a signal is applied to the gate electrode of the first thin film transistor and/or the gate electrode of the second thin film transistor, so as to control whether the first thin film transistor and/or the second thin film transistor is turned on or turned off. For example, the first power line and/or the second power line may also be connected to the control circuit, so that the control circuit can also control whether the first power line and/or the second power line transmits power signals. In the embodiment, the connection relationship of the first power line, the second power line, and the control circuit formed in the lithium-ion battery can refer to FIG. 1A, FIG. 2A, and FIG. 3A, which are not described in the embodiment.

In addition, the method of the embodiment can also form the lithium-ion battery as shown in FIG. 5 and FIG. 6. The difference from the above example is that the formation order of the respective film layers is different, so that the relative positions of the respective film layers are changed.

For example, when forming the lithium-ion battery as shown in FIG. 5, a gate electrode layer 201, a gate insulating layer 202, an active layer 203, and a first insulating layer 204 of a thin film transistor that serves as a switching element are first formed, and then the same film layer is used to form the source-drain electrode layer 205 and the first electrode current collector 101 of the lithium-ion battery cell, finally, a second insulating layer 206, a connection electrode 207, a first electrode 102 of the lithium-ion battery cell, an electrolyte layer 103 of the lithium-ion battery cell, a second electrode 104 of the lithium-ion battery cell, a second electrode current collector 105 of the lithium-ion battery cell, and the like are formed. In this example, the forming materials and forming methods of the functional layers can refer to the above examples, and are not repeated here.

For example, when forming the lithium-ion battery as shown in FIG. 6, first, a first electrode current collector 101, a first electrode 102, an electrolyte layer 103, and a second electrode 104 of the lithium-ion battery cell are formed, and then the same film layer is used to form the gate electrode layer 201 of the thin film transistor that serves as the switching element and the second electrode current collector 105 of the lithium-ion battery cell, finally, a gate insulating layer 202, an active layer 203, a first insulating layer 204, a source-drain electrode layer 205, and a second insulating layer 206 of the thin film transistor, and a connection electrode 207 are formed. In this example, for the forming materials and forming methods of the functional layers, reference may also be made to the above examples, and details are not described herein again.

In the lithium-ion battery manufactured by the manufacturing method of the lithium-ion battery provided in the embodiments, the switching element can control each lithium-ion battery cell, for example, control the charging operation, the discharging operation, or the like of each lithium-ion battery cell. Therefore, the switching element can selectively turn on one or some of the lithium-ion battery cells, so that the lithium-ion battery cells of the lithium-ion battery can work independently, in a case of not needed, the lithium-ion battery cells can work at different time to reduce unnecessary waste of resources. For example, the lithium-ion battery cells can respectively and independently perform a charging operation and a discharging operation, so as to reduce unnecessary charging and discharging of some lithium-ion battery cells, thereby prolonging the lifetime of lithium-ion battery cells. In addition, in the lithium-ion battery provided in the embodiments, each lithium-ion battery cell is independent, in a case where a lithium-ion battery cell is damaged, other lithium-ion battery cells can still work normally, thereby not affecting the normal use of the overall lithium-ion battery and making the lithium-ion battery have higher stability and reliability.

The following statements should be noted:

(1) The accompanying drawings involve only the structure(s) in connection with the embodiment(s) of the present disclosure, and other structure(s) can be referred to common design(s).

(2) For the purpose of clarity, in accompanying drawings for illustrating the embodiment(s) of the present disclosure, the thickness of a layer or a region may be enlarged or narrowed, that is, the drawings are not drawn in a real scale. However, it should be understood that, in the case in which a component such as a layer, a film, area region, a substrate, or the like is referred to be "on" or "under" another component, the component may be "directly" "on" or "under" the another component or an intermediate component is interposed therebetween.

(3) In case of no conflict, the embodiments of the present disclosure and features in the embodiments can be combined with each other to obtain new embodiments.

What have been described above are only specific implementations of the present disclosure, the protection scope of the present disclosure is not limited thereto. Any modifications or substitutions easily occur to those skilled in the art within the technical scope of the present disclosure should be within the protection scope of the present disclosure. Therefore, the protection scope of the present disclosure should be based on the protection scope of the claims.

What is claimed is:

1. A lithium-ion battery, comprising:
   at least one lithium-ion battery cell; and
   at least one switching element;
   wherein each of the at least one switching element is respectively connected to one or more of the at least one lithium-ion battery cell to control the one or more of the at least one lithium-ion battery cell;
   the switching element is a thin film transistor; the lithium-ion battery further comprises a first power line;
   the lithium-ion battery cell comprises a first electrode and a second electrode, and the first electrode is connected to the first power line through a first thin film transistor;
   wherein the first thin film transistor comprises a source electrode and a drain electrode, one of the source electrode and the drain electrode of the first thin film transistor is connected to the first electrode, and an other one of the source electrode and the drain electrode of the first thin film transistor is connected to the first power line;
   each of the at least one lithium-ion battery cell comprises a first electrode current collector, a first electrode, an electrolyte layer, a second electrode, and a second electrode current collector, and the first electrode current collector, the first electrode, the electrolyte layer, the second electrode, and the second electrode current collector are disposed in a stack manner;
   the first electrode current collector is in a same layer as one of a gate electrode layer and a source-drain electrode layer of the thin film transistor; and
   the second electrode current collector is in a same layer as an other one of the gate electrode layer and the source-drain electrode layer of the thin film transistor.

2. The lithium-ion battery according to claim 1, further comprising a second power line,
wherein the second electrode of the lithium-ion battery cell is connected to the second power line through a second thin film transistor, wherein the second thin film transistor comprises a source electrode and a drain electrode, one of the source electrode and the drain electrode of the second thin film transistor is connected to the second electrode, and an other one of the source electrode and the drain electrode of the second thin film transistor is connected to the second power line.

3. The lithium-ion battery according to claim 2, further comprising a control circuit configured to control each of the at least one lithium-ion battery cell to be charged and discharged;
a gate electrode of the first thin film transistor and/or a gate electrode of the second thin film transistor is connected to the control circuit.

4. The lithium-ion battery according to claim 3, wherein the first power line and/or the second power line is connected to the control circuit.

5. The lithium-ion battery according to claim 1, wherein the electrolyte layer is a solid electrolyte layer.

6. A manufacturing method of a lithium-ion battery, comprising:
forming at least one lithium-ion battery cell; and
forming at least one switching element;
wherein each of the at least one switching element is formed to be respectively connected to one or more of the at least one lithium-ion battery cell to control the one or more of the at least one lithium-ion battery cell;
the forming the lithium-ion battery cell comprises forming a first electrode current collector, a first electrode, an electrolyte layer, a second electrode current collector, and a second electrode, and the first electrode current collector, the first electrode, the electrolyte layer, the second electrode current collector, and the second electrode are formed in a stack manner; and
the first electrode current collector and one of the gate electrode layer and the source-drain electrode layer are formed by using a same film layer.

7. The manufacturing method of the lithium-ion battery according to claim 6, wherein the switching element is a thin film transistor; and forming the thin film transistor comprises forming a gate electrode layer and a source-drain electrode layer.

8. The manufacturing method of the lithium-ion battery according to claim 6, wherein the second electrode current collector and an other one of the gate electrode layer and the source-drain electrode layer are formed by using a same film layer.

9. The manufacturing method of the lithium-ion battery according to claim 6, wherein the electrolyte layer is a solid electrolyte layer.

* * * * *